(No Model.) 2 Sheets—Sheet 1.
I. E. STUMP.
STREET SWEEPER.
No. 601,598. Patented Mar. 29, 1898.
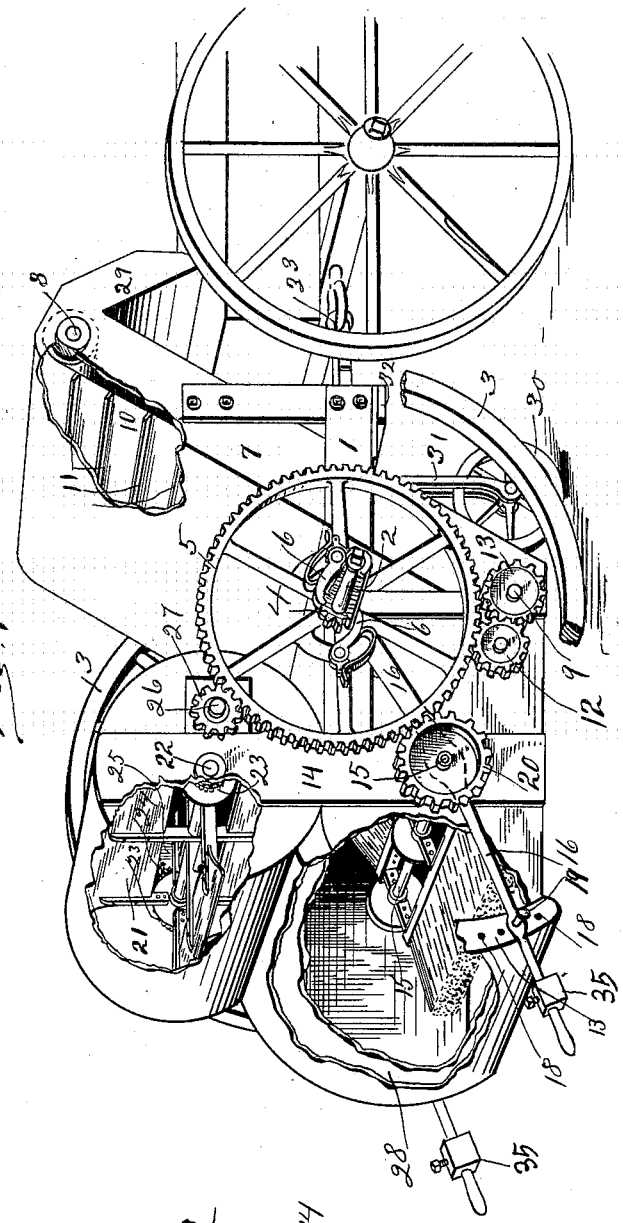
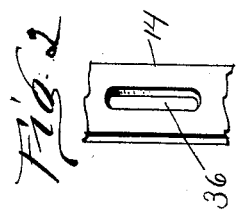
Witnesses
Inventor
Ira E. Stump
By Fred W. Bond
Atty.

(No Model.) 2 Sheets—Sheet 2.
I. E. STUMP.
STREET SWEEPER.
No. 601,598. Patented Mar. 29, 1898.
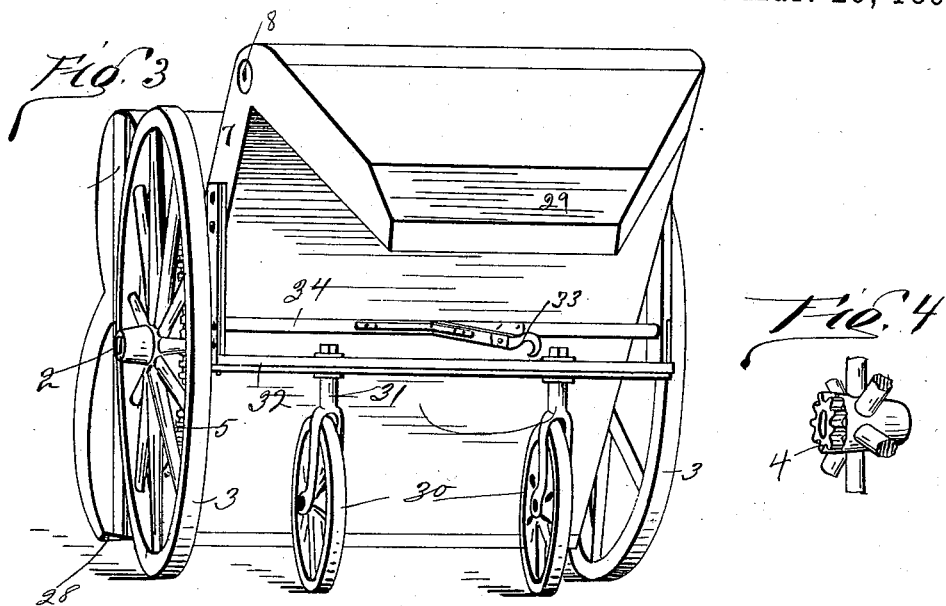
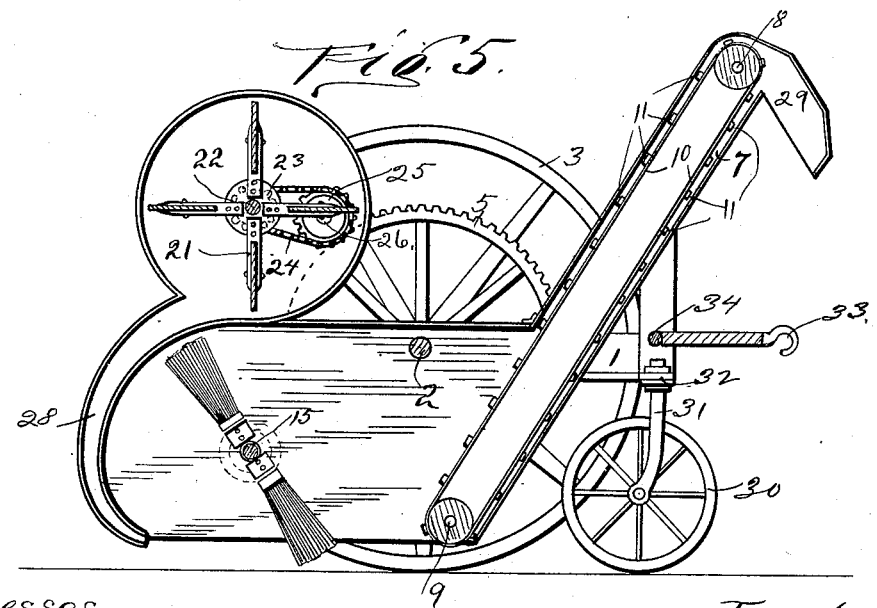
Witnesses
Inventor
Ira E. Stump
By Fred M. Bond
Atty.

UNITED STATES PATENT OFFICE.

IRA E. STUMP, OF CANTON, OHIO, ASSIGNOR TO CHARLES SEEMANN AND JACOB M. SCHNEIDER, OF SAME PLACE.

STREET-SWEEPER.

SPECIFICATION forming part of Letters Patent No. 601,598, dated March 29, 1898.

Application filed December 24, 1896. Serial No. 616,958. (No model.)

*To all whom it may concern:*

Be it known that I, IRA E. STUMP, a citizen of the United States, residing at Canton, in the county of Stark and State of Ohio, have invented certain new and useful Improvements in Street-Sweepers; and I do hereby declare that the following is a full, clear, and exact description of the same, reference being had to the annexed drawings, making a part of this specification, and to the figures of reference marked thereon, in which—

Figure 1 is a perspective view showing parts broken away. Fig. 2 is a detached view showing a portion of one of the upright members of the frame. Fig. 3 is a view showing the front or forward end of the sweeper. Fig. 4 is a view showing one of the hubs of the traveling wheels and its toothed wheel. Fig. 5 is a longitudinal vertical section.

The present invention has relation to street-sweepers; and it consists in the different parts and combination of parts hereinafter described, and particularly pointed out in the claim.

Similar figures of reference indicate corresponding parts in all the figures of the drawings.

In the accompanying drawings, 1 represents the side members of the frame, which are held the desired distance apart by suitable crosspieces properly located and arranged at any desired points, so as not to interfere with the different parts of the sweeper. Upon the axle 2 are loosely mounted the traveling wheels 3, which traveling wheels are constructed in the ordinary manner and are provided with the toothed wheels 4, which toothed wheels rotate with the traveling wheels 3. Upon the axle 2 are mounted the cog-wheels 5, and when it is desired to have the cog-wheels 5 rotate with the traveling wheels the spring-catches 6 are brought into engagement with the teeth of the wheel 4, said spring-catches or dogs being pivotally attached to the arms of the cog-wheels 5, and when it is desired to throw the sweeper out of gear the dogs 6 are released. To the frame of the machine proper are attached the side members 7, which side members constitute the sides of the elevator-frame and to which side members are journaled the roller-shafts 8 and 9, said shafts being located and arranged substantially as shown in the drawings. Around the rollers 8 and 9 is located the elevating-canvas 10, to which elevating-canvas are attached in any convenient and well-known manner the ribs 11. For the purpose of inclosing the elevating-canvas suitable boards or other material should be attached to the members 7.

For the purpose of communicating rotary motion to the roller 9 the pinions 12 are provided, which pinions mesh with the cog-wheels 5 and the pinions 13, said pinions 13 being securely attached in any convenient and well-known manner to the roller 9.

The side members 14 are securely attached to the side members 1 for the purpose of strengthening the frame of the machine proper and providing a means for attaching the different parts of the machine, as hereinafter described. The brush-shaft 15 is properly journaled to the levers 16, which levers are connected at their inner ends to the axle 2 and are so connected that the rear ends of the lever 16 may move up and down for the purpose hereinafter described.

For the purpose of holding the levers 16 at the desired point of adjustment the segmental bars 13 are provided, which segmental bars are provided with a series of apertures, such as 18, for the purpose of receiving the pins 19, which pins are passed through suitable apertures formed in the levers 16. Upon the brush-shaft 15 are securely attached the pinions 20, which pinions mesh with the wheels 5.

It will be understood that by pivoting the inner ends of the levers 16 to the axle 2 the outer ends of said levers can be moved up and down without throwing the pinions 20 out of mesh. The object and purpose of providing a means for adjusting the height of the brush-shaft 15 is to move the brush proper to or from the ground, by which arrangement the ends of the brushes are adapted to strike light or heavy upon the surface being swept, thereby adapting the machine proper for various kinds of work. For the purpose of creating a blast the fan 21 is provided, which fan may be located as illustrated in the drawings.

Upon the fan-shaft 22 are located the sprocket-wheels 23, around which sprocket-wheels are located the drive-chains 24, said drive-chains leading to and passing around the sprocket-wheels 25, which sprocket-wheels are securely attached to the shaft 26, which shaft is provided with the pinions 27. Said pinions mesh with the wheels 5, thereby communicating rotary motion to the fan 21.

For the purpose of directing the blast of the fan and bringing the same to the rear of the brush the chamber 28 is provided, which chamber is formed of a width to correspond with the length of the brush. It will be understood that as the machine proper is drawn forward rotary motion will be communicated to the brush and to the fan, by which arrangement the dirt lifted by the brush will be blown forward onto the elevator, from whence it is conveyed upward and delivered into the top or upper end of the delivery-spout 29. It will be understood that by the use of the fan and the blast produced thereby the fine particles of dust will be removed from the street, thereby removing all particles from the surface of the street. For the purpose of supporting the front or forward portion of the machine proper the front wheels 30 are provided, which wheels are properly journaled to the bottom or lower ends of the yokes 31 and the top or upper ends of said yokes journaled to the cross-bar 32.

For the purpose of providing a means for attaching the sweeper to the rear end of a wagon the hooked bar 33 is provided, which hooked bar is connected to the shaft 34, said shaft being securely attached at its ends to the frame of the machine.

For the purpose of causing the brush proper to follow the surface of the ground the pins 19 may be removed, thereby leaving the levers free at their outer ends and permitting the brush to move up and down. The weights 35 are so attached to the levers that they can be moved to or from the brush proper, thereby increasing or decreasing the pressure. For the purpose of allowing the free movement of the levers 16 the side members 14 are provided with the elongated slots 36, through which elongated slots the brush-shaft 15 passes.

Having fully described my invention, what I claim as new, and desire to secure by Letters Patent, is—

The combination of a traveling frame, and endless elevator, mechanism therein, a rotating brush adjustably mounted in the frame at the rear of the elevator mechanism, a fan mechanism mounted on the frame a blast-conduit leading from the fan mechanism to the rear of the brush, and means for operating the working parts substantially as and for the purpose specified.

In testimony that I claim the above I have hereunto subscribed my name in the presence of two witnesses.

IRA E. STUMP.

Witnesses:
F. W. BOND,
BERTHA FINCH.